3,461,166
COORDINATION COMPOUNDS OF ALKALI
METAL HALIDES AND RACEMIC DIARYL
DIAMINES
Nicasio P. Marullo, Clemson, S.C., assignor to Research
Corporation, New York, N.Y., a nonprofit corporation
No Drawing. Filed Mar. 10, 1966, Ser. No. 533,245
Int. Cl. C07c 87/50
U.S. Cl. 260—579                                    4 Claims

ABSTRACT OF THE DISCLOSURE

Solid alkali metal coordination compounds of water soluble alkali metal salts of monobasic acids and racemic diamines are made by contacting an aqueous solution of the alkali metal salts with a solution of a racemic diamine compound of the formula

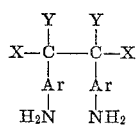

wherein Ar in an aryl ring, X is alkyl and Y is alkyl or hydrogen, the X's being different from the Y's. The formation of the new coordination compounds provides a method for the separation of alkali metal from alkaline earth metals.

---

This invention relates to novel solid alkali metal salt coordination compounds and methods of making them.

I have found that when aqueous solutions containing alkali metal salts of monobasic acids are contacted with solutions of racemic diamino compounds of the formula

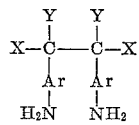

wherein Ar is an aryl ring, X is alkyl and Y is alkyl or hydrogen, the X's being different from the Y's, so that the two carbons to which the groups are attached are asymmetric, solid coordination compounds of the alkali metal salts and the diamines are formed.

Analysis of the compounds formed under varying conditions has established that the compounds thus formed are both stoichiometric and constant in composition with a molar ratio of alkali metal salt to diamine of 1 to 3.

The monobasic anion of the alkali metal salt may be any moderate to strongly acid anion such as chloride, bromide, iodide, nitrate and azide.

Since the alkaline earth metal salts do not form solid coordination compounds under the conditions set forth above formation of the new alkali metal compounds provides a method of separating alkali metals from alkaline earth metals. Moreover, since the affinity of alkali metal salts for the diamines varies very substantially among the alkali metals formation of the new compounds also provides a method for the separation of the alkali metals from each other.

The new compounds can be readily made by agitating a solution of the diamine in a solvent immiscible with water, with a saturated aqueous solution of an alkali metal salt of a monobasic acid but more conveniently, for most purposes, the new compounds are made by mixing an aqueous solution of the alkali metal salt with a solution of the diamine in a water-miscible organic solvent as in the following illustrative example:

An aqueous solution of 0.288 g. of sodium chloride in 8 ml. of water is mixed with a solution of 2.4 g. of racemic p,p′ - diamino - 2, 3 - diphenylbutane(I) in 24 ml. of ethanol. When the precipitate thus formed is recrystallized from 25 ml. of 1:3 aqueous ethanol 1.91 of a crystalline product fusing to a clear melt at 200° C. is formed. There is no apparent phase separation when the melt is kept at or above its melting point for an extended period of time. Elemental analysis indicate a composition of three molecules of I per molecule of sodium chloride. The molar ratio of the product was unchanged when the molar ratio of I to sodium chloride in the preparation is varied from 2:1 to 18:1. Diffraction analysis and density measurements indicate a unit cell containing 12 formula units of I and 4 units of sodium chloride.

When the product is made from aqueous solutions of sodium chloride containing water soluble salts of alkaline earth metals, such as calcium and barium, compounds of the alkaline earth metals are not precipitated with the sodium chloride coordination product.

Illustrating the differential affinity of different alkali metal salts for the diamine compound, when the foregoing method is carried out with a molar ratio of 4 I to 1 each of NaCl and KCl, the resulting precipitate contained NaCl and KCl in the molar ratio of 18.5 to 1.

The solid coordination compounds can be broken down into the constituent alkali metal salt and amine by heating the compound to its fusion point, cooling the melt to a turbid glass consisting of a dispersion of the salt in the amine and dissolving the amine in ether or other organic solvent leaving the salt as a residue.

I claim:
1. Solid coordination compounds of alkali metal halides and racemic diamino compounds of the formula

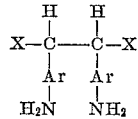

wherein Ar is a phenyl ring and X is lower-alkyl, in the molar ratio of 3 moles of diamine to one mole of the alkali metal halide.

2. Solid coordination compounds of sodium chloride and racemic p,p′ - diamino - 2,3 - diphenylbutane in the molar ratio of 3 moles of the diamine to 1 mole of sodium chloride.

3. A method of making solid alkali metal coordination compounds which comprises contacting an aqueous solution of an alkali metal halide with a solution of a racemic diamino compound of the formula

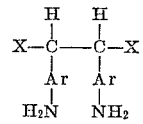

wherein Ar is a phenyl ring and X is lower-alkyl.

4. A method of making solid alkali metal coordination compounds which comprises contacting an aqueous solution of sodium chloride with a solution of racemic p,p′-diamino-2,3-diphenylbutane.

References Cited

UNITED STATES PATENTS 3,006,976   10/1961   Shaw et al. _____ 260—579

FLOYD D. HIGEL, Primary Examiner

PATRICIA C. IVES, Assistant Examiner

U.S. Cl. X.R.

23—89, 90